United States Patent [19]

Farrar

[11] 3,821,156

[45] June 28, 1974

[54] POLYETHYLENE TEREPHTHALATE FILM
[75] Inventor: Grover L. Farrar, Greenville, S.C.
[73] Assignee: Celanese Corporation, New York, N.Y.
[22] Filed: Jan. 3, 1972
[21] Appl. No.: 215,141

[52] U.S. Cl. .................. 260/40 R, 260/DIG. 35
[51] Int. Cl. ............................................ C08g 51/04
[58] Field of Search ................. 260/40 R, DIG. 35

[56] References Cited
UNITED STATES PATENTS

| | | | |
|---|---|---|---|
| 3,154,461 | 10/1964 | Johnson | 260/40 R |
| 3,221,226 | 11/1965 | Kennedy et al. | 260/40 P |
| 3,382,206 | 5/1968 | Karickhoff | 260/40 R |
| 3,479,318 | 11/1969 | Jackson et al. | 260/40 R |
| 3,565,852 | 2/1971 | Conix et al. | 260/40 R |

FOREIGN PATENTS OR APPLICATIONS 1,104,089  2/1968  Great Britain .................. 260/75

Primary Examiner—Allan Lieberman
Assistant Examiner—S. M. Person
Attorney, Agent, or Firm—Thomas J. Morgan; Linn I. Grim; Marvin Bressler

[57] ABSTRACT

A polyethylene terephthalate film having improved abrasion resistance and the method for producing the film. The film is characterized by the inclusion of dispersed particles of an inert additive and calcium carbonate.

6 Claims, No Drawings

POLYETHYLENE TEREPHTHALATE FILM

BACKGROUND OF THE DISCLOSURE

1. Field of the Invention

This invention is directed to an improved polyethylene terephthalate film and the method by which the film is produced. More specifically, the instant invention is directed to an improved polyethylene terephthalate film in which dispersed particles of calcium carbonate and an inert additive are included and the process for making said film.

2. Summary of the Prior Art

One of the primary uses for polyethylene terephthalate film is as a substrate for tapes used in electronics applications. Film which is employed in electronic applications, such as magnetic tapes, usually encounter considerable physical contact with the equipment with which they are used. This physical contact causes the tape to abrade which significantly decreases its useful life. Thus, a critical property of polyethylene terephthalate film which is employed in electronic tape applications is its ability to withstand abrasive forces.

This problem has been considered in the prior art. Specifically, commonly assigned copending application, Ser. No. 53,025, filed July 7, 1970 and now U.S. Pat. No. 3,669,931, is directed to a polyethylene terephthalate film which has outstanding fatique abrasion resistance. In the copending application hydrated aluminum silicate particles are dispersed in biaxially oriented polyethylene terephthalate film to produce improved abrasion resistance compared to prior art polyethylene terephthalate films.

Although the invention of the copending application represents a significant improvement in the art, abrasion continues to be a major problem in film destined for use in electronic applications, especially films used in magnetic tape applications. The problem of abrasion of films used as magnetic tapes may be separated into two distinct areas. The first area relates to what is known as "fatique abrasion". The second type of abrasion encountered by magnetic tape is "frictional abrasion".

Fatique abrasion results from the continued movement of polyester film-based magnetic tape during use. As those skilled in the art are aware, magnetic tape is coated on one side with a magnetic coating upon which information is stored. It is thus the uncoated side of the tape that abrades with the resultant formation of powder-like polyethylene terephthalate debris. Fatique-type abrasion results in both temporary and permanent errors in the reading of the information stored on the magnetic oxide coating. This occurs as a result of wind-up of the tape. The debris on the surface of the uncoated side is deposited on the coated side of the tape covering portions of the coating. This debris can cause separation of the tape from the reading head, resulting in an error. This error is temporary in those cases where the debris is dislodged during operation. In many instances, however, debris particles are pushed into the coating during wind-up. The debris, wound into the reel of tape, causes an indentation in the tape which, indentation on a subsequent pass through the read head, causes head-to-tape separation resulting in a loss of information. It is to the improvement of fatique loss abrasion that the copending application is directed.

A second distinct abrasion problem common to polyethylene terephthalate films employed in magnetic tape applications is frictional abrasion. During the manufacture of polyethylene terephthalate film and during processing of the film prior to coating of the film to form the final magnetic tape product, the film is subjected to considerable frictional resistance. This is caused by the passing of the film over rolls rotating at different speeds, and more seriously, by the passing of the moving film over stationary objects, such as stationary guides, stalled rolls and the like. This causes the formation of polyethylene terephthalate debris on the uncoated film which is in the form of white powder.

It is well known that white powder debris on polyethylene terephthalate film can and often does result in defective magnetic tapes. Film is converted into magnetic tape by the coating over, on one side of the film, with a magnetic oxide. If the surface to be coated contains debris, that portion of the film surface covered with debris is uncoated. Rather, the debris is coated. This coated debris results in a non-uniform tape surface being obtained. Specifically, nodules due to overcoats of the debris are formed on the otherwise smooth tape surface. These nodules can result in a loss of recorded information if they are of a certain size. For this reason, magnetic tape manufacturers will not accept polyethylene terephthalate film which contains visible amounts of white powder. Moreover, film upon which, although free of debris upon receipt by the magnetic tape manufacturer, debris forms during processing prior to coating is similarly rejected.

Although the films of the prior art are subjected to both fatique and frictional abrasion the invention of the copending application is a significant advance in the area of resistance to fatique abrasion. However, none of the polyethylene terephthalate films of the prior art, including the copending application, have addressed themselves to the problem of frictional abrasion of polyethylene terephthalate film employed as magnetic tape.

SUMMARY OF THE INVENTION

The instant invention is directed to a biaxially oriented polyethylene terephthalate film which has outstanding resistance to not only fatique abrasion but to frictional abrasion as well.

In accordance with the instant invention a polyethylene terephthalate film is provided. The film, which is biaxially oriented has a coefficient of friction of from about 0.3 to about 0.5 as measured by the ASTM D1894 test and an intrinsic viscosity in excess of 0.3 deciliter per gram, preferably in the range of about 0.4 to about 1.0 deciliter per gram measured in orthochorophenol at 25°C. The film includes completely dispersed particles of calcium carbonate and an inert additive present in a concentration in the range of 0.02 percent to about 0.1 percent and 0.01 percent to about 0.5 percent by weight, respectively. The dispersed particles range in size from about 0.5 to about 30 microns for calcium carbonate particles and from about 10 to about 1,000 millimicrons for the inert additive particles. Inert additives within the contemplation of the instant invention include silica, talc, calcined and hydrated aluminum silicate and the like.

A further aspect of the instant invention is the process by which the improved polyethylene terephthalate film described above is formed. The calcium carbonate and the inert additive particles are completely dispersed within the polyethylene terephthalate polymer. A polyethylene terephthalate polymer including calcium carbonate and inert additive particles therein is prepared. The polymer is extruded into a sheet. The sheet is biaxially stretched, to provide strength, at a temperature in the range of about the second order transition temperature of the polymer to below the temperaure at which the polymer softens and melts. The resultant film is thereafter heated at a temperature in the range of about 190°C to about 240°C for a period of time sufficient to substantially crystallize the film.

DETAILED DESCRIPTION

The improved film of the instant invention is formed from a polymer produced by polymerization of bis(2-hydroxy ethyl) terephthalate. Bis(2-hydroxy ethyl)-terephthalate is itself formed as an intermediate by one of two different methods. One method for producing bis(2-hydroxy ethyl)terephthalate is by direct esterification of terephthalic acid and ethylene glycol as described in U.S. Pat. No. 3,050,533. In this method the by-product of the reaction is water which is distilled from the reaction product. The other method for producing bis(2-hydroxy ethyl)terephthalate, is the transesterification reaction of a dialkyl ester of terephthalic acid (especially dimethyl terephthalate) with at least about two molecular proportions of ethylene glycol per molecular proportion of dialkyl terephthalate. It is preferred to use higher proportions of ethylene glycol, i.e., in excess of two molecular proportions per molecular proportion of the dialkyl terephthalate since under these conditions the initial transesterification is caused to take place more rapidly and completely. The transesterification reaction is conducted under conditions of elevated temperatures (from about the boiling temperature of the reaction mixture to as high as 250° C) and at atmospheric, subatmospheric or superatmospheric pressures. The by-product of the transesterification reaction is an alkanol, for example, if dimethyl terephthalate is used, methanol is removed from the reaction product. Many known catalysts can be used to speed transesterification reaction.

After the bis(2-hydroxy ethyl)terephthalate has been produced, it is converted to polyethylene terephthalate polymer by heating to a temperature above the boiling point of ethylene glycol or reaction mixture under conditions effecting removal of the glycol or water and to temperatures as high as 325°C, if desired. It is essential in obtaining the desired polymerized product that during the heating, or during a portion of the heating period, the pressure be reduced so as to provide rapid distillation of the excess glycol or water. The pressure may be reduced in successive stages so that the heating begins at normal pressure, is continued at a reduced pressure and is completed at a further reduced pressure. Final pressures in the range from about 1 to 10 millimeters Hg are preferred. The materials used as catalysts in the esterification reaction may also be present as a catalyst in the polymerization reaction. The preferred polymerization catalysts are antimony compounds such as antimony trioxide, antimonic acid and the like to accelerate conversion of the bis(2-hydroxy ethyl)terephthalate to polyethylene terephthalate polymer having an intrinsic viscosity, as measured in ortho-chlorophenol, in excess of 0.3 deciliter per gram, and preferably ranging from about 0.4 to about 1.0 deciliter per gram. Still more preferably, the polyethylene terephthalate polymer of the instant invention has an intrinsic viscosity of about 0.5 to 0.7 deciliter per gram.

The heating of the polymerization reaction is conducted under conditions to prevent oxidation, i.e., any presence of oxygen should be avoided, and a slow stream of an inert gas, for example, nitrogen, carbon dioxide and the like can be passed through or over the molten mass. During the heating and polymerization, viscosity of the melt gradually increases; the temperature must be maintained high enough to keep the mass in the molten state during the entire heating period. The heating is continued at least until a film can be formed from the melt which possesses the desired properties and the melting point of the polymerized product exceeds about 240°C, preferably exceeding 250°C. After heating is completed the product may be utilized to produce films or otherwise removed from the reaction vessel in molten form and formed into blocks, chips, and the like for further use.

Within the polyethylene terephthalate polymer described above is incorporated substantially completely dispersed particles of calcium carbonate and an inert additive. The inert particles are selected from the group consisting of silica, talc, calcined aluminum silicate, hydrated aluminum silicate, and combinations of the above. The calcium carbonate and inert additive particles are added either to the bis(2-hydroxy ethyl)-terephthalate reactants, i.e., to the ethylene glycol, or to the bis(2-hydroxy ethyl)terephthalate itself. It is essential, however, that the dispersion of the particles be maintained throughout the polymer. In a preferred embodiment the inert additive and calcium carbonate particles are completely dispersed by adding the particles to the glycol and exposing the mixture to ultrasonic vibrations. The amount of inert additive particles in the polymer can range from about 0.01 percent to about 0.5 percent and preferably from about 0.5 percent to about 0.3 percent by weight based on the total polymer weight. The average particle size of the inert additive particles range from about 10 to 1,000 millimicrons. The calcium carbonate concentration ranges from about 0.02 to about 0.1 percent by weight of the total polymer. More preferably, the calcium carbonate concentration is in the range of 0.02 percent to 0.05 percent by weight of the polymer. The average particle size of the calcium carbonate ranges from about 0.5 to 30 microns. More preferably, the average particle size of the calcium carbonate is in the range of from 1 to 10 microns. The term "average particle size" is defined as the volume of particle equal to the volume of a sphere of known cross-sectional area. The average particle size is measured by X-ray sedimentation analysis on a commercially available instrument such as the Micromeritics Model 5000 Particle Size Analyzer.

After the polyethylene terephthalate polymer containing particles of calcium carbonate and inert additive has been produced, the polymer is extruded on polished revolving casting drums and biaxially stretched, i.e., forward and lateral stretching in either order or simultaneously to impart strength and toughness to the resultant film. The amount of stretching can range from about 2.5 to about 4.0 times the original dimensions, preferably in the range from 2.8 to about 3.8 times the original dimensions. The stretching operation is carried out at temperatures in the range of from about the second order transition temperature and below the temperature at which the polymer softens and melts. In a more preferred embodiment this temperature is in the range of about 75°C to about 150°C. The method of forming the film can be carried out by the use of conventional orientation equipment which consistently produces a uniform product.

After the film has been stretched, the film is heat treated for a period of time necessary to complete substantially the crystallization of the polyethylene terephthalate film to impart stability to the film. The heat treatment temperature ranges from about 190°C to about 240°C and preferably from about 215°C to about 235°C. Temperatures in the heat treatment ranges described above provide films which have superior dimensional stability suitable for magnetic tape applications.

The unique feature of the film of the instant invention is that the presence of calcium carbonate and inert additive particles within the film provides improved frictional abrasion resistance without sacrificing acceptable fatique abrasion resistance. In addition, the polyethylene terephthalate film of the instant invention has excellent slip characteristics, with a coefficient of friction ranging from about 0.3 to 0.5 as measured by the ASTM D-1894 test. As will be demonstrated in the examples below, polyethylene terephthalate film with included calcium carbonate and inert additive particles have superior abrasion resistance characteristics compared with polyethylene terephthalate film including calcium carbonate particles only or polyethylene terephthalate film containing only inert additive particles.

The following examples are given to illustrate the invention. Nothing contained in the examples should, in any way, be interpreted as limiting the scope and spirit of the invention illustrated by these examples.

EXAMPLE 1

3,500 pounds of dimethyl terephthalate and 2600 pounds of ethylene glycol are placed in a reaction vessel. The mixture is heated to 150°C. To the mixture is added 6.3 pounds of hydrated aluminum silicate ($Al_2O_3 \cdot SiO_2 \cdot H_2O$) containing 13.8 percent chemically combined water having an average particle size of 500 millimicrons and 1.05 pounds of calcium carbonate having an average particle size of 3 microns. The calcium carbonate and hydrated aluminum silicate particles are completely dispersed in 40 pounds of ethylene glycol by ultrasonic vibrations. Additionally, 1.7 pounds of manganese glycol oxide in 6 pounds of ethylene glycol is added to the reaction mixture. The reaction mixture is heated to 200°C at atmospheric pressure while removing methanol from the mixture for a period of time sufficient to remove the theoretical amount of methanol produced. The temperature is gradually increased while removing the excess ethylene glycol until the temperature reaches 225°C to form monomeric bis(2-hydroxy ethyl)terephthalate. To the monomeric bis(2-hydroxy ethyl)terephthalate is added a catalyst, 1.5 pounds of antimony trioxide, dispersed in 6 pounds of ethylene glycol.

Ethylene glycol is removed during the polymerization and the temperature is maintained until the intrinsic viscosity of the polymer reaches about 0.6 deciliter per gram measured in orthochlorophenol at 25°C.

EXAMPLE 2

A polyethylene terephthalate polymer prepared in accordance with the procedure described in Example 1 except that 7.35 pounds of silica ($SiO_2$) having an average particle size of 50 millimicrons and 0.75 pound of calcium carbonate having an average particle size of 3 microns are employed. The polymer, containing completely dispersed particles of calcium carbonate and silica has an intrinsic viscosity of 0.6 deciliter per gram measured in ortho-chlorophenol at 25°C.

EXAMPLE 3

In the same manner as Example 1, polyethylene terephthalate polymer is prepared except that 1.30 pounds of calcium carbonate having a particle size as described in Example 1 is substituted for the 6.3 pounds of hydrated aluminum silicate and 1.05 pounds of calcium carbonate used in Example 1. The polymer formed has an intrinsic viscosity of 0.6 deciliter per gram measured in ortho-chlorophenol at 25°C.

EXAMPLE 4

A polyethylene terephthalate polymer is prepared in the same manner as in Example 1 except that 7.0 pounds of hydrated aluminum silicate having an average particle size of 500 millimicrons is substituted for the 6.3 pounds of hydrated aluminum silicate and 1.05 pounds of calcium carbonate of Example 1. The resultant polymer has an intrinsic viscosity of 0.6 deciliter per gram measured in ortho-chlorophenol at 25°C.

EXAMPLE 5

A polyethylene terephthalate polymer is prepared in accordance with procedure described in Example 1 except that 8.75 pounds of silica having an average particle size of 50 millimicrons is employed instead of the hydrated aluminum silicate and calcium carbonate particles of Example 1. The resultant polyethylene terephthalate polymer formed has an intrinsic viscosity of 0.6 deciliter per gram measured in ortho-chlorophenol at 25°C.

EXAMPLES 6, 7, 8, 9 and 10

The polymer melts of Examples 1–5 are extruded on a polished revolving drum to form a continuous sheet. The sheet is subjected successively to a forward stretching and then to a lateral stretching at temperatures in the range from about 75°C to about 130°C throughout the stretching process. The film is then heat set for 30 seconds at a temperature in the range of 190°C to 240°C, cooled and wound on a mandrel. The comparative results using varying conditions are summarized in Table 1.

TABLE I

|  |  | Example 6 Calcium Carbonate/ Hydrated Aluminum Silicate | Example 7 Calcium Carbonate/ Silica | Example 8 Calcium Carbonate Only | Example 9 Hydrated Aluminum Silicate Only | | Example 10 Silica Only |
|---|---|---|---|---|---|---|---|
| Draw Ratio | Length | 3.0 | 3.5 | 3.0 | 3.0 | 3.0  3.5 | 3.5 |
|  | Width | 3.2 | 3.8 | 3.2 | 3.2 | 3.2  3.8 | 3.8 |
| Heat Set Crystallization Temperature — °C |  | 215 | 225 | 215 | 215 | 215  225 | 225 |
| Intrinsic Viscosity Deciliter per Gram |  | 0.6 | 0.6 | 0.6 | 0.6 | 0.6  0.6 | 0.6 |
| Abrasion Characteristics Fatique — mg* |  | 34 | 45 | 20–25 | 25–30 | 20–25  35 | 10–15 |
| Friction** |  | 1 | 1 | 2 | 3 | 10  10 | 10 |

\* Determination of Fatique Abrasion — The film is slit into ½ inch width. The film having a length of 2,600 feet is wound on a standard computer tape reel (supply reel). The film is threaded on an Ampex TM - 2 transport from the supply reel by looping in a vacuum chamber passing through a rotating capstan and capstan roller (without pulling but used as the driving force in reverse cycle) over read and write heads pulled over a rotating capstan and capstan roller through a loop in a second vacuum chamber and onto a take-up reel. This film is shuttled 25 cycles (50 passes). The amount of abraded material generated is collected from the transport chamber and guides by a specially constructed suction system and weighed on an analytical balance. The abraded material is measured in milligrams for 2,600 feet by ½ inch film. The lesser the mass of abraded material collected the more resistant is the film against abrasion caused by fatique (long term use).

\*\* Determination of Frictional Abrasion — This test measures the frictional abrasion resistance of polyethylene terephthalate film. This is accomplished by subjecting a polyethylene terephthalate film sample to differential speeds ranging from a small velocity gradient to a maximum gradient based on the zero rotational speed of a stalled roll. The film sample, having a width of 13 inches and a length of 1000 feet, is transported over two chrome plated rolls in an S-type configuration so that each side of the film is contacted. The transporting system is a device that imparts a translational velocity of 175 fpm to the film while maintaining a tension of 0.8 – 1.5 pounds per linear inch of width. The chrome plated rolls may be rotating at a speed ranging from slightly less than the translational speed of the film to zero velocity (stationary), and may be operated at elevated temperatures (70°C. to 80°C., e.g.) or at ambient temperature. The area of contact of the film with the roll is observed for the appearance of film abradings (debris) which may collect on the roll or may be swept along by the moving film. The inspector compares the film to selected control samples run under identical conditions. The film is assigned a number from 1 to 10. A rating of 1 is given when the tested film is identical to a sample on which no debris is present. This represents excellent frictional abrasion resistance and the best test rating. A rating of 2 is acceptable and represents a film in which small amounts of debris are present only at the film edges. A rating of 3 indicates a light coating of debris across the film. A rating of 3 is unacceptable. All ratings above 3 indicate greater amounts of debris formation and are, of course, unacceptable. The lowest rating is 10 which represents a film which exhibits massive amounts of debris present after undergoing the above described "stalled roll" test.

The above preferred embodiments and examples illustrate the scope of the instant invention. Other embodiments and examples within the scope of the instant invention are within the contemplation of this invention. Therefore, the scope of this invention should be limited only by the scope of the appended claims.

What is claimed is:

1. An abrasion resistant biaxially oriented polyethylene terephthalate film having an intrinsic viscosity in excess of 0.3 deciliters per gram, said film including from about 0.01 percent to about 0.5 percent by weight of inert additive particles selected from the group consisting of silica and hydrated aluminum silicate, said particles having an average particle size ranging from about 10 to about 1000 millimicrons and from about 0.02 percent to about 0.1 percent by weight of calcium carbonate particles having an average particle size of about 0.5 to about 30 microns, said inert additive and calcium carbonate particles being substantially completely dispersed throughout said film.

2. A film in accordance with claim 1 wherein said inert additive particles dispersed in said film ranges in amount from about 0.05 percent to about 0.3 percent by weight of the film and said calcium carbonate dispersed in said film comprises from about 0.2 percent to 0.05 percent by weight of the film.

3. A film in accordance with claim 1 wherein said average particle size of said calcium carbonate ranges from about 1 to 10 microns.

4. A film in accordance with claim 1 wherein said intrinsic viscosity of said film ranges from about 0.4 to about 1.0 deciliter per gram.

5. A film in accordance with claim 1 wherein said inert additive is silica.

6. A film in accordance with claim 1 wherein said inert additive is hydrated aluminum silicate.

* * * * *